(12) United States Patent
Ouchi et al.

(10) Patent No.: US 6,580,724 B1
(45) Date of Patent: Jun. 17, 2003

(54) METHOD OF PREVENTING DATA DESTRUCTION IN MULTIPLEX COMMUNICATION SYSTEM

(75) Inventors: Katsuhiro Ouchi, Saitama (JP); Sumitaka Ogawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,358

(22) Filed: Aug. 5, 1999

(30) Foreign Application Priority Data

Aug. 5, 1998 (JP) .......................................... 10-221684

(51) Int. Cl.$^7$ .......................................... H04L 12/413
(52) U.S. Cl. ........................................ 370/445; 370/447
(58) Field of Search .............................. 370/445, 447, 370/462, 461, 463, 441, 431, 442, 466, 401; 701/1, 48, 36; 375/342, 316, 357, 355

(56) References Cited

U.S. PATENT DOCUMENTS

| 5,402,420 | A | * | 3/1995 | Kobayashi | ................... | 370/212 |
| 5,495,469 | A | * | 2/1996 | Halter | ........................ | 370/212 |
| 5,579,299 | A | * | 11/1996 | Halter | ........................ | 370/212 |
| 5,699,250 | A | * | 12/1997 | Kobayashi | ................... | 701/48 |
| 5,790,603 | A | * | 8/1998 | Maeda | ........................ | 375/342 |
| 6,374,161 | B1 | * | 4/2002 | Iwai | .............................. | 701/1 |

FOREIGN PATENT DOCUMENTS

JP          A 5211511          8/1993

* cited by examiner

*Primary Examiner*—Dang Ton
*Assistant Examiner*—Ricardo M. Pizarro
(74) *Attorney, Agent, or Firm*—Birch, Stewart, Kolasch & Birch, LLP

(57) ABSTRACT

A method of and apparatus for preventing data destruction in a multiplex communication system. The invention is useful in a bit serial scheme to prevent transmission data from being destroyed by collision caused by the time delay in transmission data between transmitter and receiver. After sending transmission data, a transmitter starts a transmission clock when a receiver has received the data. When the received data has become non-priority, the receiver resets the reception clock. The transmitted data is compared with the received data, and the transmission is stopped whenever a mismatch is detected. In addition, a non-prioritized bit signal is provided after the unit address for determining transmission priority in the above-mentioned transmission data format. The invention is useful in preventing data destruction in a vehicle control system, which controls the operation of a plurality of units mounted on a vehicle, e.g. an ABS system, a vehicle speed sensor, a cam pulser, and other vehicle systems.

15 Claims, 11 Drawing Sheets

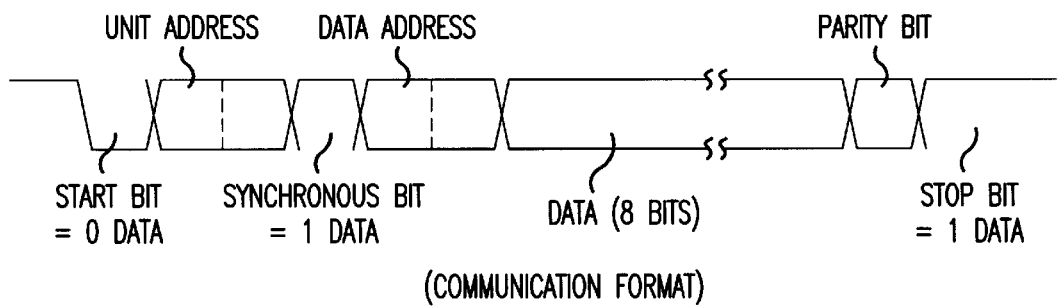
(COMMUNICATION FORMAT)
FIG.4
| PRIORITY | UNIT ADDRESS | |
|---|---|---|
| 1 | 0 | 0 |
| 2 | 0 | 1 |
| 3 | 1 | 0 |
| 4 | 1 | 1 |
FIG.5
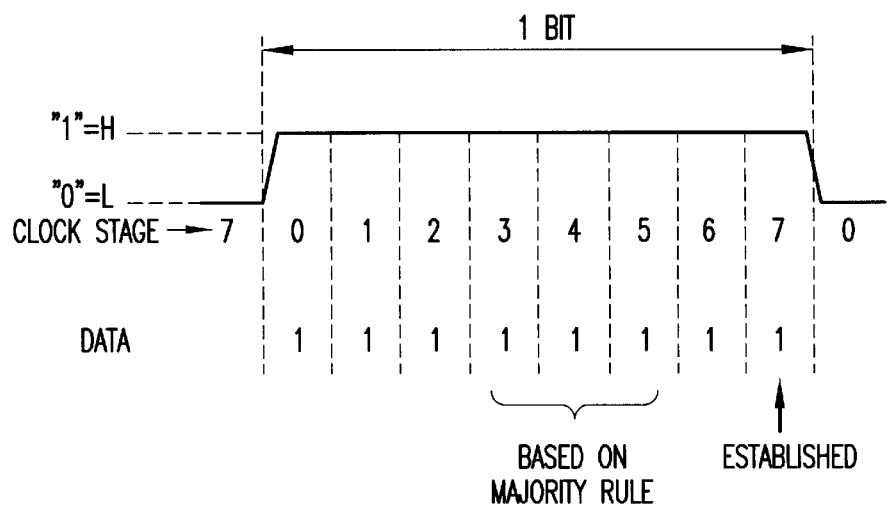
FIG.6

| PRIORITY | UNIT ADDRESS | SYNCHRONOUS BIT |
|---|---|---|
| 1 | 0 0 | 1 |
| 2 | 0 1 | 1 |
| 3 | 1 0 | 1 |
| 4 | 1 1 | 1 |

FIG.12

| PRIORITY | UNIT ADDRESS | SYNCHRONOUS BIT |
|---|---|---|
| 1 | 0 0 0 | 1 |
| 2 | 0 0 1 | 1 |
| 3 | 0 1 0 | 1 |
| 4 | 0 1 1 | 1 |
| 5 | 1 0 0 | 1 |
| 6 | 1 0 1 | 1 |
| 7 | 1 1 1 | 1 |

FIG.13

COMPARATIVE ART

COMPARATIVE ART

METHOD OF PREVENTING DATA DESTRUCTION IN MULTIPLEX COMMUNICATION SYSTEM

CROSS-REFERENCE TO RELATED APPLICATIONS

This non-provisional application claims priority under 35 U.S.C. §119(a) to Japanese Patent Application No. Hei-10-221684, filed Aug. 5, 1998, the entirety of which is hereby incorporated by reference.

BACKGROUND OF THE INVENTION

1. Field of the Invention

The present invention relates generally to a method of preventing data destruction in a multiplex communication system. The invention acts to prevent surviving transmission data from being destroyed whose transmission was stopped due to the delay in collision detection in a network communication based on CSMA/CD (Carrier Sense Multiple Access with Collision Detect).

2. Background Art

In network communication based on CSMA/CD, two or more communication apparatuses connected to the network simultaneously start sending transmission data, these communication apparatus keep sending the transmission data while the same transmission data is flowing over the network, then, when they start indicating a mismatch in the transmission data, those communication apparatus which are prioritized over others in the transmission data survive, and the communication apparatus having the highest priority ultimately survives to continue sending the transmission data.

In the above-mentioned communication scheme, if the other communication apparatus are not outputting transmission data over the network, the communication apparatus in question is always ready for outputting transmission data. Therefore, a communication apparatus A that started transmission from a transmission terminal Tx1 at time t1 can start transmission upon a determination that no other communication apparatus started transmission because of a hardware time delay between transmitter and receiver until time t3, at which transmission data a of the communication apparatus A is inputted to the reception terminals RX1 and RX2 of each communication apparatus. Consequently, another communication apparatus B may start sending transmission data b from its transmission terminal Tx2 at time t2 which lies between time t1 and time t3.

If such a situation occurs, received data c at the reception terminals RX1 and RX2 of each communication apparatus becomes longer in H (High) level width than the transmission data by $\Delta t1$ as shown in FIGS. 14 and 15. As a result, the communication apparatus A and B each determine that each has received the transmission data different from that sent by each, accordingly, both communication apparatus stop sending the transmission data.

In order to resolve such a problem, the method disclosed in Japanese Patent Laid-open No. Hei 5-211511 controls the pulse width such that, as shown in FIG. 15, the falling of the transmission data a and b transmitted from the transmission terminals Tx1 and Tx2 takes place at point of time which has passed by $\Delta \alpha$ from time t3 at which the reception terminals RX1 and RX2 of the communication apparatus receive the transmission data a previously transmitted, $\Delta \alpha$ a being obtained by subtracting time $\Delta t1$ indicating a delay in reception of transmission data from time T corresponding to the bit information of digital data.

The above-mentioned conventional device is effective for so-called pulse width digital modulating (PWM scheme) in which, if the bit information of digital data is 0, the pulse width (namely, a H level time) is $\frac{2}{3}$ of 1-bit time and, if the bit information is 1, the pulse width is $\frac{1}{3}$ of the 1-bit time. However, in this PWM scheme, the bit information is PWM-controlled, thereby complicating the control of sending and receiving transmission data. On the other hand, in the bit serial scheme, in which, if the bit information of digital data is 0, the pulse width is 0, namely 1-bit time L (Low) level, and, if bit information 1, the pulse width is 1-bit time H (High) level, the pulse width of 1-bit information is not varied, thereby simplifying the control of sending and receiving transmission data. However, the technology disclosed in the above-mentioned patent laid-open corrects the data shift caused by a time lag between transmitter and receiver by varying the pulse width, so that this technique is not applicable to a bit serial scheme.

SUMMARY OF THE INVENTION

It is therefore an object of the present invention to provide a method of preventing data destruction in a multiplex communication system effectively in a bit serial scheme, which can prevent the destruction caused by collision of transmission data due to the time lag in the transmission data between the transmitter and the receiver.

In carrying out the invention and according to one aspect thereof, there is provided a method of preventing data destruction in a multiplex communication system in which a clock is provided for time-dividing the 1-bit data to perform bit serial communication control for establishing bit data depending on a state of a plurality of items of data in a central portion obtained by the time division. This method may be effected by carrying out the steps of starting, by the transmitter, after transmitting transmission data, a transmission clock when the transmission data has been received by the receiver; resetting, by the receiver, a reception clock when the received data has become nonpriority data; comparing the transmission data established by the transmission clock with the received data in a bit serial manner; and, stopping the transmission whenever a mismatch is found.

According to this novel configuration, the clocks of the transmitter and the receiver can be synchronized with each other. If there is a time delay of less than 1-bit time between the transmitter and the receiver, and two or more communication apparatuses start transmission during that time delay, data destruction due to data collision can be prevented.

In carrying out the present invention and according to another aspect thereof, a communication format to be transmitted by the transmitter has a non-prioritized bit signal after a unit address for determining transmission priority. According to this novel configuration, the number of communication apparatuses connected to the multiplex communication system can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a diagram showing a communication format according to the invention.

FIG. 5 is a diagram illustrating a relationship between transmission priority and unit address.

FIG. 6 is a diagram illustrating a relationship between 1-bit data and a clock for time-dividing this 1-bit data.

FIG. 12 is a diagram illustrating the addition of a synchronous bit to 2-bit unit addresses.

FIG. 13 is a diagram illustrating the addition of a synchronous bit to 3-bit unit addresses.

DETAILED DESCRIPTION OF THE PREFERRED EMBODIMENTS

Figure 1:
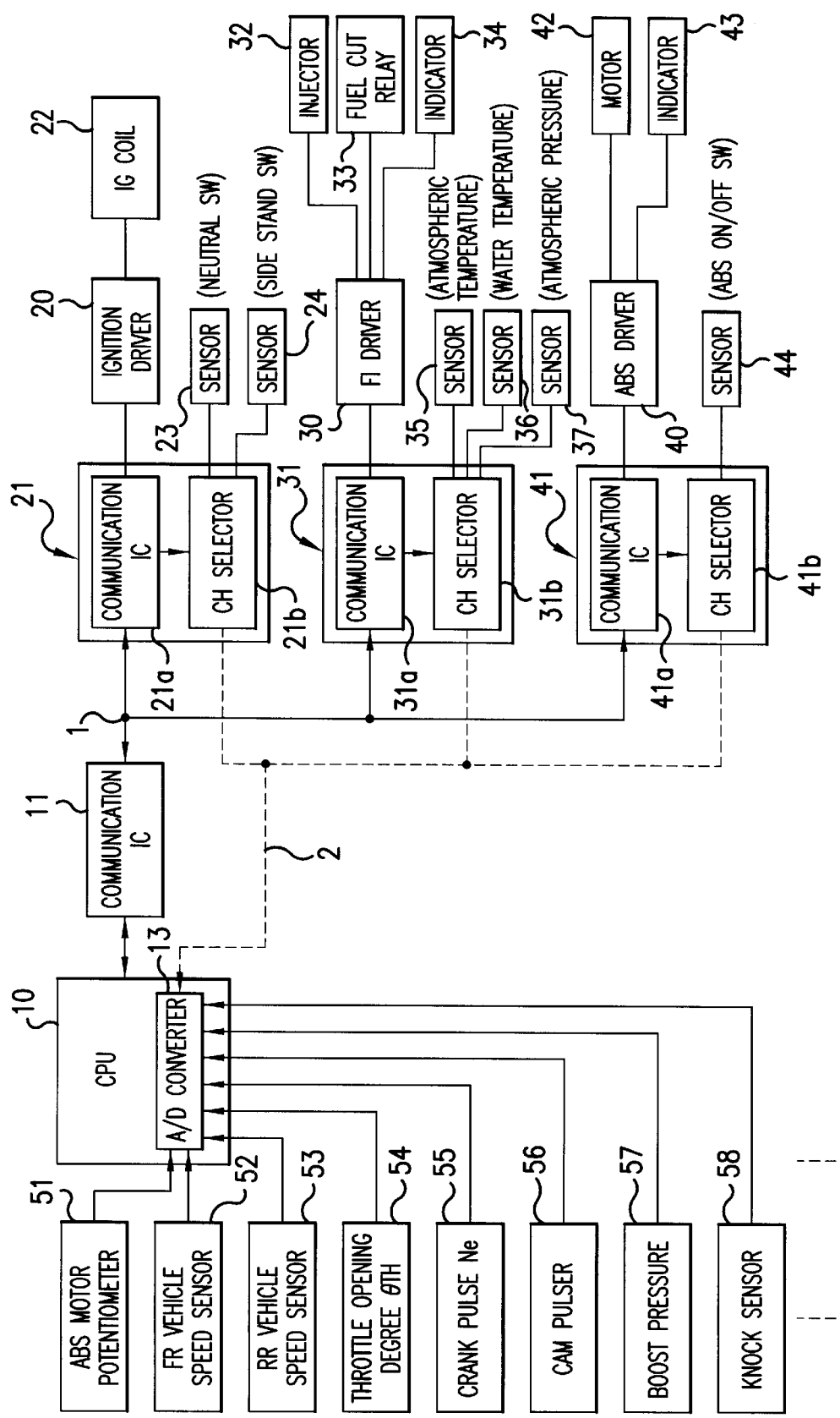
FIG. 1 is a block diagram illustrating a configuration of a vehicle control system according to a preferred embodiment of the invention.

FIG. 1 is a block diagram illustrating one embodiment to which a communication apparatus according to the present invention is applied, indicating a vehicle control system for controlling a plurality of units mounted on a vehicle. In this vehicle control system, a command issued by one CPU 10 controls units requiring high-speed processing such as an ignition driver 20, an FI (Fuel Injection) driver 30, and an ABS (Anti-lock Brake System) driver 40 in multiplex communication. Sharing the CPU amongst these units contributes to cost reduction.

The ignition driver 20 is connected with an IG (Ignition) coil 22, establishing communication with a communication IC (Integrated Circuit) 11 of the CPU 10 through a communication IC 21a in an input/output unit 21. The FI (Fuel Injector) driver 30 is connected with an injector 32, a fuel cut relay 33, an indicator 34, and so on, establishing communication with the communication IC 11 of the CPU 10 through a communication IC 31a in an input/output unit 31. The ABS driver 40 is connected with a motor 42 and an indicator 43, establishing communication with the communication IC 11 through a communication IC 41a in an input/output unit 41. The communication IC 11, the communication IC 21a, the communication IC 31a, and the communication IC 41a are interconnected by a digital communication line 1. Components requiring no high-speed processing such as an ignition neutral SW (switch) 23, a side stand SW 24, sensors 35, 36, and 37 for measuring the atmospheric temperature, water temperature, and atmospheric pressure of the FI, and an ABS on/off sensor 44 are connected to one port of an A/D (Analog/Digital) converter 13. The A/D converter 13 is incorporated in the CPU 10 collectively with an analog communication line 2 through a CH (Channel) selector 21b in the input/output unit 21, a CH selector 31b in the input/output unit 31, and a CH selector 41b in the input/output unit 41, respectively.

Components requiring processing with high-speed timing, such as an ABS motor potentiometer 51, an FR (Front Wheel) vehicle speed sensor 52, an RR (Rear Wheel) vehicle sensor 53, a throttle opening degree (OTH) 54, a crank pulse (Ne) 55, a cam purser 56, a boost pressure (PB) 57, and a knock sensor 58, are connected directly to the A/D converter 13.

Figure 2:
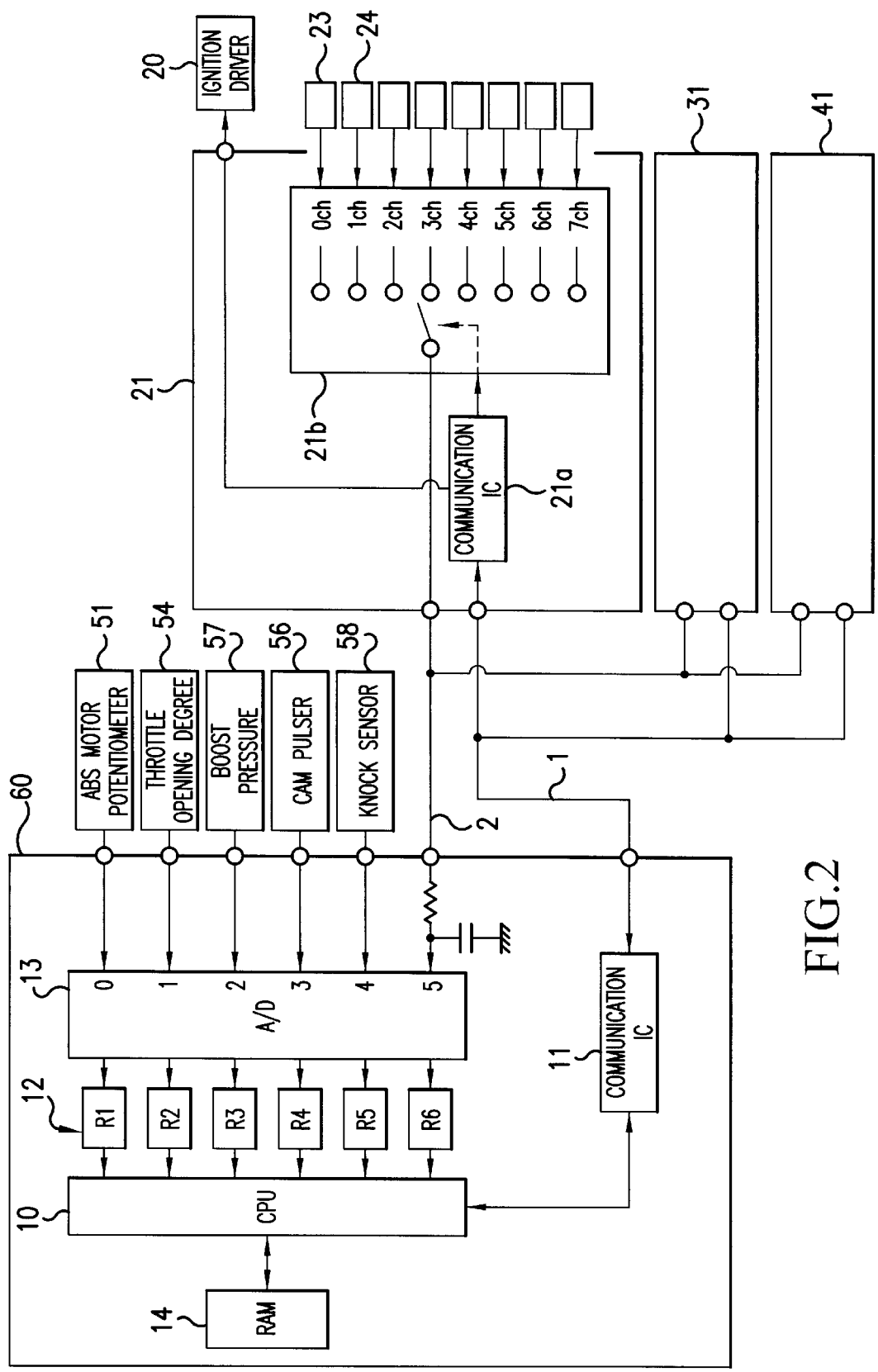
FIG. 2 is a block diagram illustrating a partial detailed view of the system shown in FIG. 1.

The following describes in more detail a configuration of the above-mentioned vehicle control system with reference to FIG. 2. A central control unit 60, serving as a parent, is connected to the input/output units 21, 31, and 41, serving as three children, through the digital communication line 1 and the analog communication line 2. The central control unit 60 is composed of the CPU 10, the communication IC 11, a register 12, the A/D converter 13, and a RAM 14. Analog signals required to be processed with high-speed timing are inputted to the A/D converter 13 at input ports 0 through 4. For example, these analog signals include high-speed analog signals to be processed within one rotation of the crank, such as the ABS potentiometer 51, the throttle opening degree 54, the boost pressure 57, the cam purser 56, and the knock sensor 58. The analog signals inputted at the input ports 0 through 4 of the A/D converter 13 are converted into digital signals and are held in registers R1 through R5, respectively, to be read by the CPU 10 with required timings. The input port 5 of the A/D converter 13 also receives analog data from the components requiring no high-speed timing processing from the units 21, 31, and 41 through the analog communication line 2. This analog data is converted by the A/D converter 13 into digital data, which is stored in a register R6 to be read by the CPU 10 with a required timing used in computation, for example.

The above-mentioned input/output units 21, 31, and 41 each have a similar configuration. Therefore, an exemplary configuration will be described with reference to the input/output unit 21. The input/output unit 21 is composed of a communication IC 21a and a CH selector 21b which may have 8 channels (0 through 7). The communication IC 21a exchanges signals with the communication IC 11 of the central control unit 60 through the digital communication line 1, and selectively sends the received control signals to the ignition driver 20 and the CH selector 21b. The ignition driver 20 is controlled by the control signal supplied from the communication IC 21a and the selector 21b connects a specified channel to the analog communication line 2. When the specified channel is connected to the analog communication line 2, the communication IC 21a returns a response to CPU 10 of the establishment of the connection through the communication IC 11. After checking this response, the CPU 10 reads the data from the register R6, so that the required data can be obtained without error. The CPU 10 uses the obtained data for computation or stores it in the RAM 14.

Figure 3:
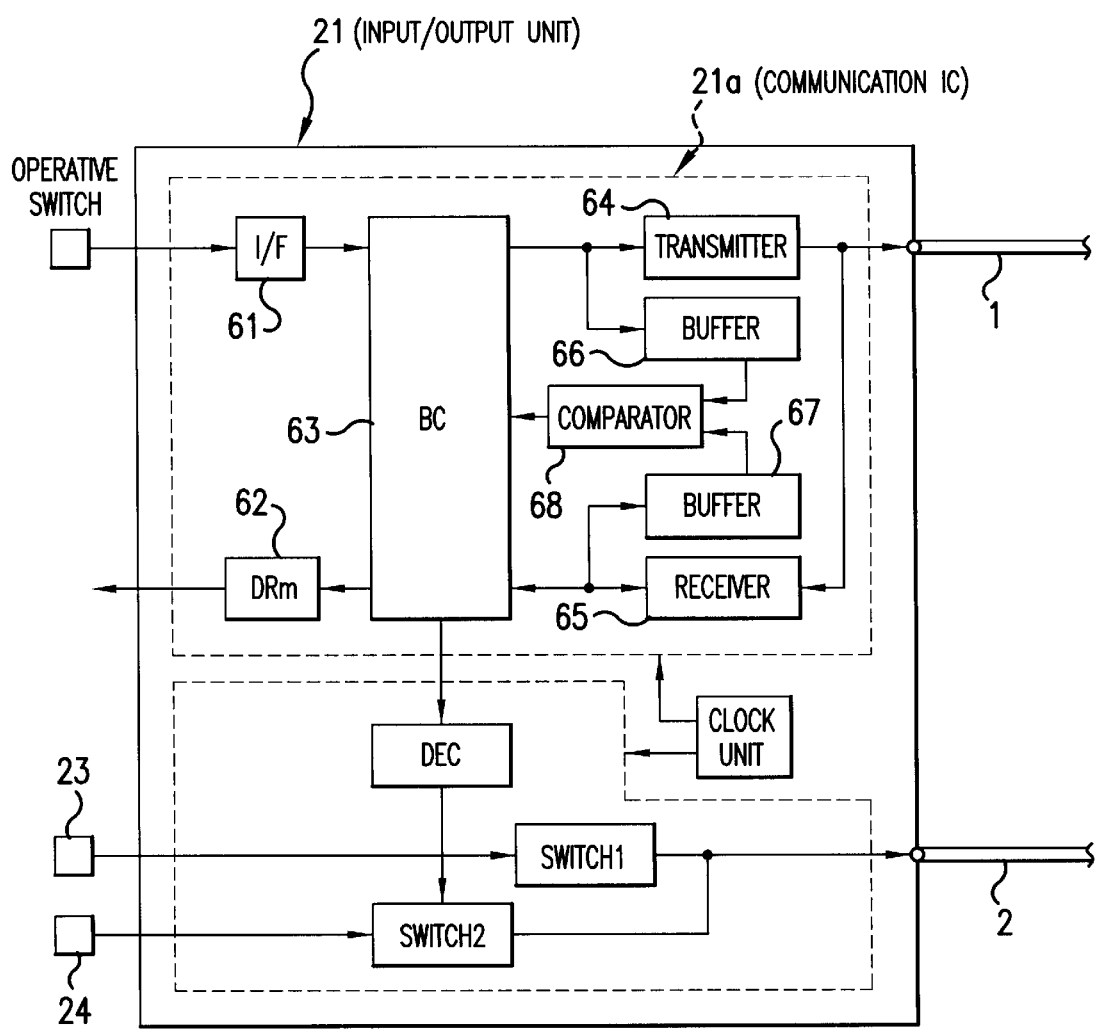
FIG. 3 is a block diagram illustrating a detailed view of an example of a communication ID.

The following describes one particular example of the configurations of the above-mentioned communication ICs 21a, 31a, and 41a with reference to FIG. 3. Because these configurations are similar in general, the configuration of the communication IC 21a of the above-mentioned ignition input/output unit 21 will be described by way of example.

The communication IC 21a is composed of an I/F (Interface) 61 connected to a operation switch like as a cassette recorder, a driver circuit 62 connected to the ignition driver 20, a bus controller (BC) 63 connected to a decoder of the above-mentioned CH selector 21b, a transmitter 64, a receiver 65, a first buffer 66 for storing transmission data, a second buffer 67 for storing received data, and a comparator 68 for making comparisons between the data stored in the first and second buffers. The CH selector 21b connected to the analog communication line 2 is composed of the decorder. Two switches SW1 and SW2 operated by the decoder which are connected to sensors 23 and 24.

A clock unit is connected to the all contents of the communication IC 21a and the CH selector 21b.

When communication starts in a communication format (described hereinbelow) by the transmitter 64, communication data is sent to the IC 11 of the central control unit 60 and the communication ICs of the input/output units 21 and 31 through the bidirectional digital communication line 1. If transmission starts only from the input/output unit 41, the comparator 68 determines that there is a match between the data stored in the first buffer 66 and the second buffer 67, and accordingly, the input/output unit 41 continues the transmitting operation. However, if two or more units start transmission simultaneously or approximately simultaneously, a data collision occurs to destroy the data, disrupting normal communication. Therefore, the present invention proposes an access method of circumventing this problem, which will be described below.

First, the communication format to be outputted by each of the above-mentioned units (the central control unit 60 and the input/output units 21, 31, and 41) is shown in FIG. 4. As shown, this format can include a 1-bit start bit, a 2-bit unit address, a 1-bit synchronous bit, a 2-bit data address, 8-bit data, a 1-bit parity bit, and a 1-bit stop bit.

The start bit signals the start of a transmission, to which 0 data is assigned. The unit address indicates the priority of transmission, which is "00", "01", "10", and "11" in the order of higher priority as shown in FIG. 5. Namely, 0 is preferred over 1. Therefore, unit address "00" is assigned to the central processing unit 60, which serves as a parent, and unit addresses "01", "10", and "11" are assigned to the input/output units 21, 31, and 41, which serve as children. The synchronous bit is provided to prevent the data of higher priority from being destroyed by data collision, to which 1 data is assigned. The data address indicates a destination in which data is stored. The parity bit is provided for data error detection, for which even/odd parity is used. The stop bit indicates the end of transmission data, to which 1 data is assigned.

The present invention also uses a bit serial scheme in which, if the bit information of digital data is 0, 1-bit time "0" level, and, if the bit information is 1, 1-bit time "1" level. In this scheme, it is obvious that the pulse width of 1-bit information cannot be varied.

The determination of whether a bit is 0 or 1 is made as shown in FIG. 6. Namely, a 1-bit time consists of an 8-clock time of clock stages 0 through 7. Based on majority rule of the data read at clock stages 3, 4, and 5, it is determined, with the timing of clock stage 7, whether the bit data is 1 or 0. In the example shown, the data read at clock stages 3 through 5 are all "1", so that, based on majority rule, it is determined that the bit data is 1 with the timing of clock stage 7. If, for example, the data read at clock stages 3 and 4 are 0 and the data read at clock stage 5 is 1, it is determined based on majority rule that the bit data is 0.

Figure 7:
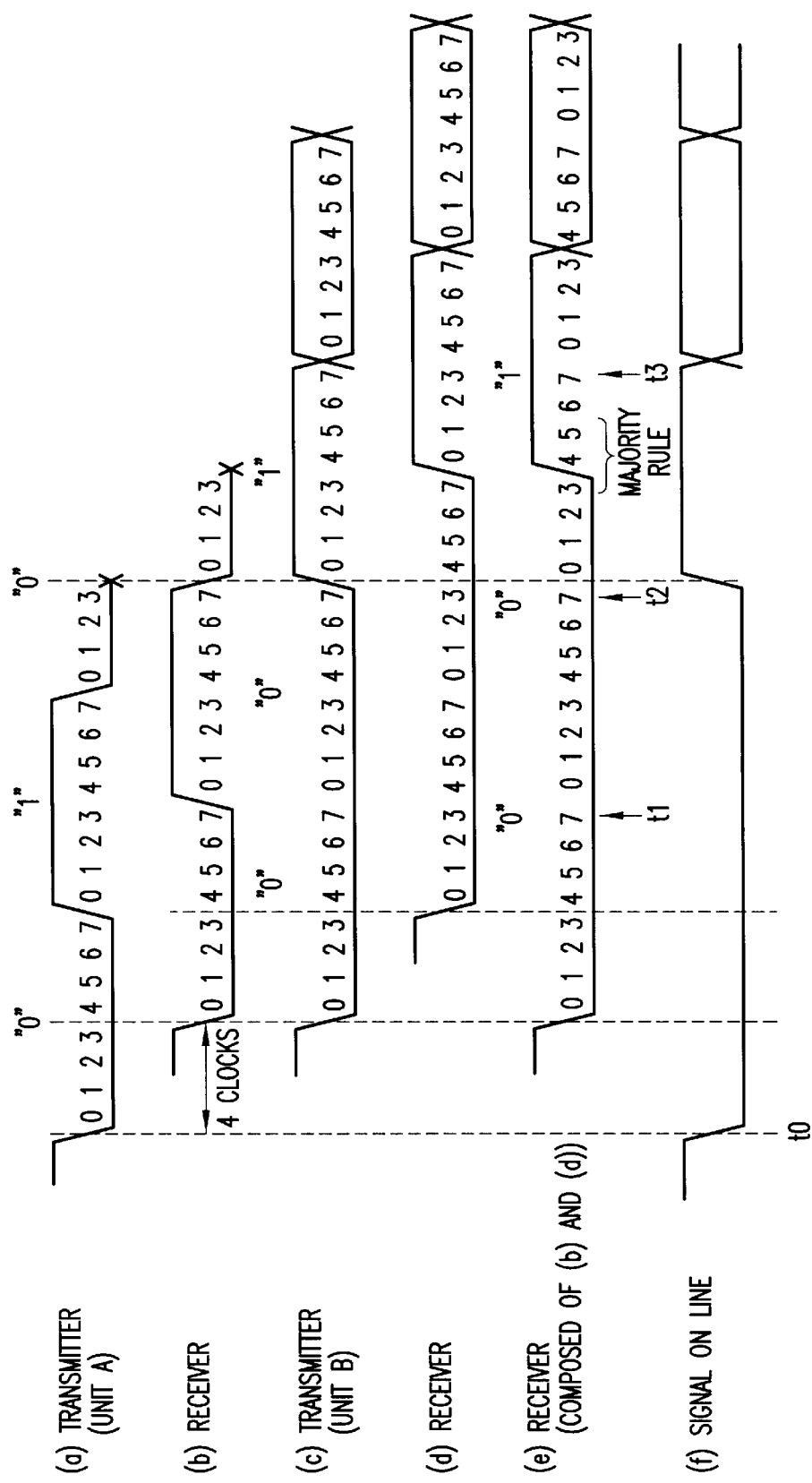
FIGS. 7(a)–(f) are timing charts with a time delay of 4 clocks between transmitter and receiver.

Meanwhile, the system configuration causes a time lag on the data outputted from the transmitter 64 of the unit 41 for example, to reach the receiver 65 of own unit or the receiver of any of the other units 60, 21, and 31. Assuming that this delay is 4 clocks long and the unit A assigned with unit address "10" starts transmission at a point of time t0 as shown in FIG. 7(a), the transmitter of the unit A outputs the unit address (=10) after the start bit (=0). The timing with which these data are received by the receiver of each unit causes a delay of 4 clocks as shown in FIG. 7(b). When each unit other than the unit A receives the start bit 0, it recognizes that there is another unit that has already started transmission, abandoning its transmission. However, until 4 clocks are passed after the unit A has started transmission, namely, until the start bit of the unit A is received, it is determined that no other unit has started transmission, so that any unit other than the unit A can start transmission.

If a unit, for example B, assigned with unit address "01" higher in priority than that of the unit A starts transmission 4 clocks after the transmission by the unit A as shown in FIG. 7(c), the receiver of each unit receives the data as shown in FIG. 7(d).

The data to be actually received by the receiver of each unit is the data obtained by composing (logic product) the above-mentioned FIGS. 7(b) and (d), resulting in the data shown in FIG. 7(e). As described above, the bit data is established with the timing of clock stage 7 based on the majority rule of the data of clock stages 3, 4, and 5, so that the receiver of each unit recognizes that the bit data of 0 (the start bit) has been received at timing t1, the bit data of 0 has been received at timing t2, and the bit data of 1 (the unit address) has been received at timing t3.

Consequently, the unit A recognizes that it has received data 0 different from the unit address outputted by itself at timing t2, or recognizes that a unit of higher priority than the unit A has started transmission at the same time, upon which the unit A stops transmission. However, at timing t2, the unit A has already transmitted the 0 data up to clock stage 3. The 0 data up to clock stage 3 is sent over the digital communication line 1 to collide with the data sent from the unit B. The receiver of the unit B receives the bit data of 1 at timing t3 as shown in FIG. 7(d). Therefore, the data outputted from the unit B is received by the receiver without destruction by the collision. The unit B receives the same data as it sent by itself, thereby continuing the transmission.

However, if the time delay between transmitter and receiver becomes 5 clocks or more, the data of clock stages 0 through 7 of "1" of the unit address "01" of the unit B becomes 0 and the data of the clock stages 5 through 7 becomes 1. Based on majority rule, the data are determined 0. Therefore, data different from that outputted by the unit B returns to it, or the data has been destroyed, upon which transmission is stopped.

Figure 8:
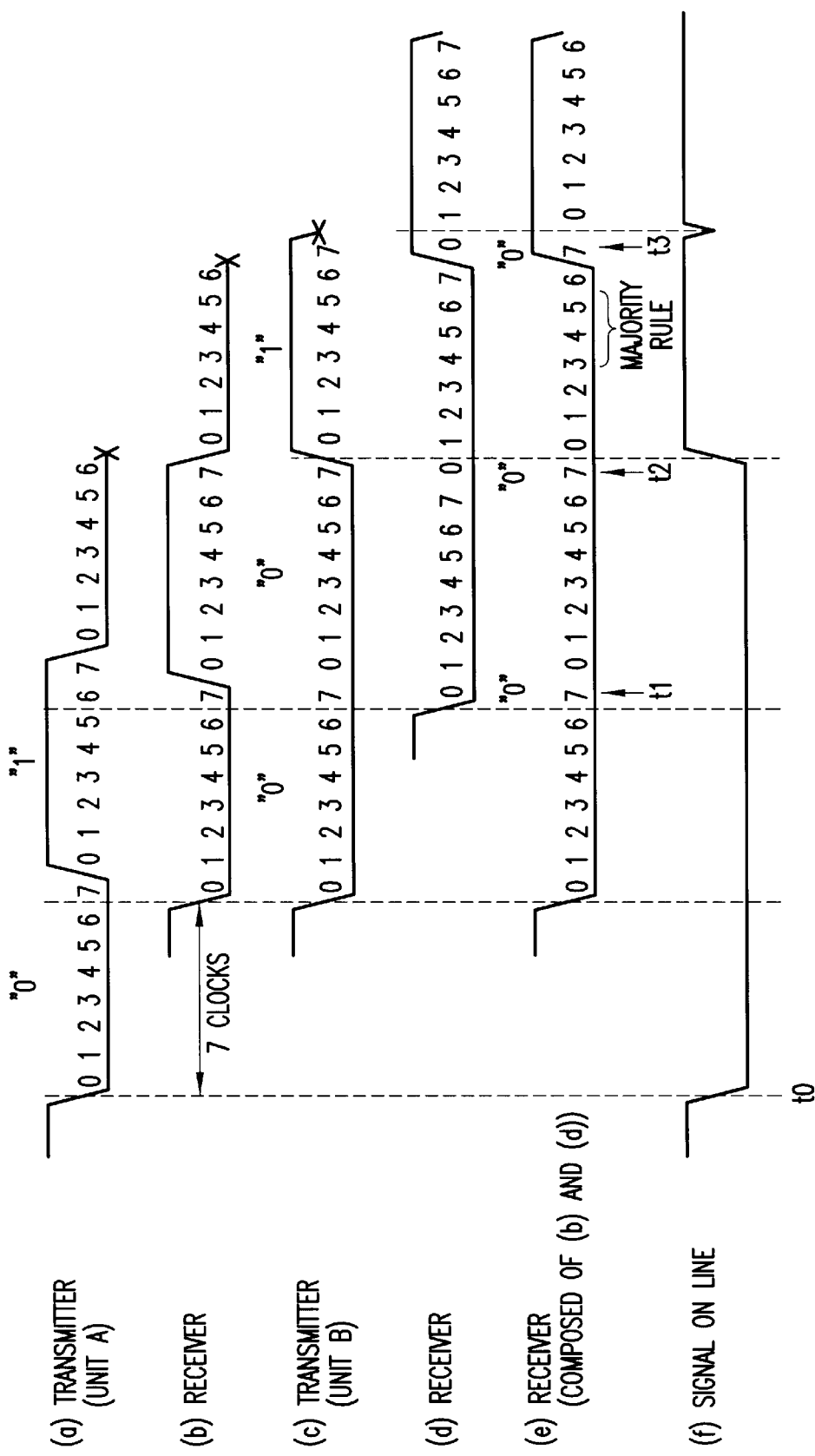
FIGS. 8(a)–(f) are timing charts with a time delay of 7 clocks between transmitter and receiver.

The occurrence of this problem is as shown in FIGS. 8(a)–(f). FIGS. 8(a)–(f) are timing charts with a 7 clock time delay between transmitter and receiver. As shown in FIG. 8(e), it is determined at timing t3 that the receiver of the unit B has received the bit data of 0, so that the unit B recognizes that data different from the data "1" transmitted by itself has returned, stopping the transmission.

In order to resolve this problem, the timing as shown in FIGS. 9(a)–(f) is used. As in FIGS. 9(a)–(f) are timing charts assuming that the time delay between transmitter and receiver is 7 clocks.

Figure 9:
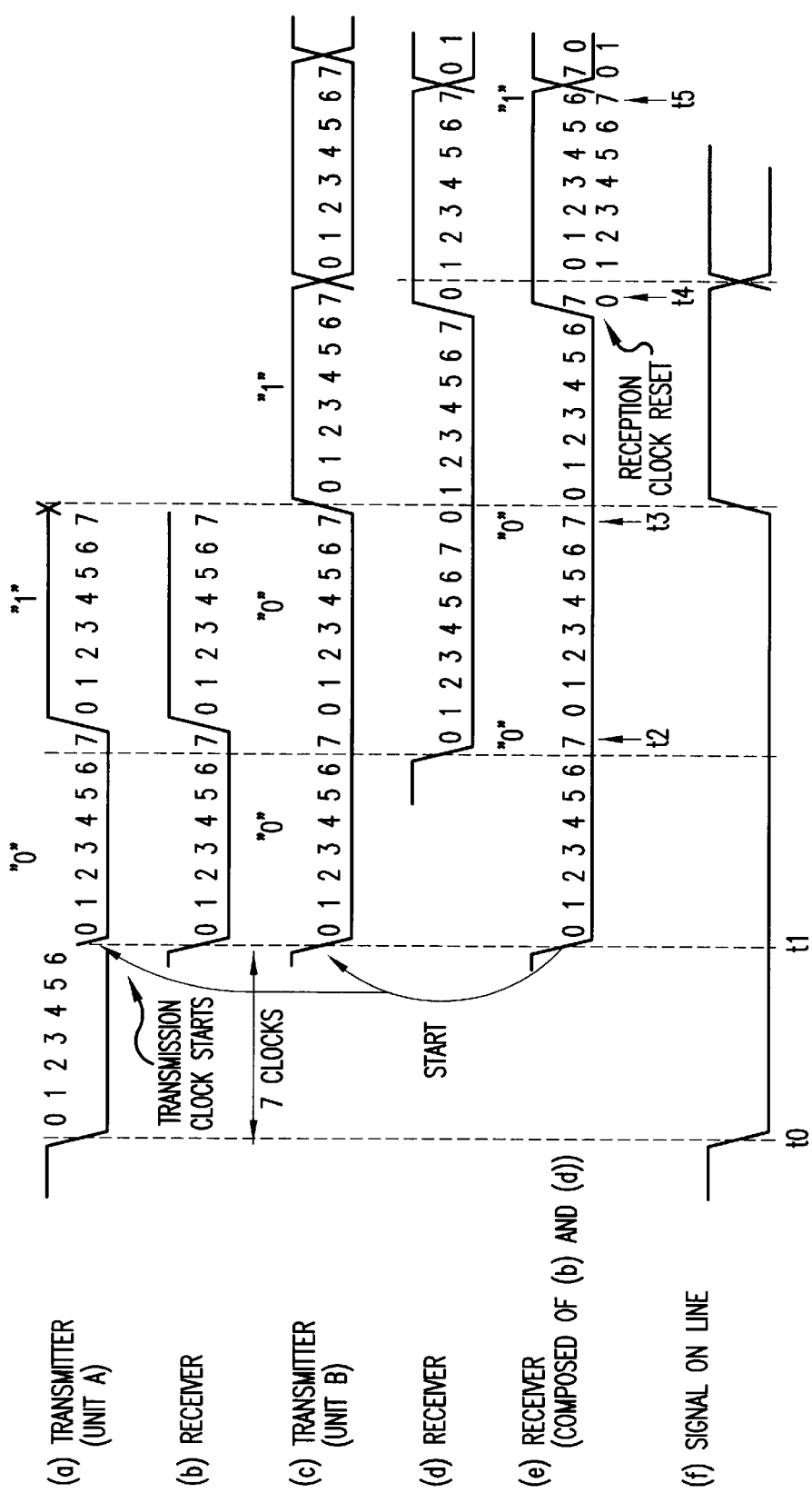
FIG. 9(a)–(f) are timing charts obtained by taking countermeasures, with a 7 clock time delay between transmitter and receiver.

As seen from FIGS. 9(a) & (c), each transmitter is adapted to a start transmission clock from a time at which a receiver has received data outputted from the transmitter of any one of the units. Specifically, the transmission clock starts from a time at which a receiver has received the falling edge of the start bit, starting a transmission. As shown in FIG. 9(e), the clock of each receiver is adapted to be reset at the rising edge of a non-priority signal (data "1").

Starting the transmission clock of each transmitter from a time at which the receiver receives the data outputted by its transmitter gives synchronization between transmission clock and reception clock, thereby providing an advantage in that the timing at which the transmitter of a unit lower in priority stops transmitting data does not occur halfway in a bit. Further, if the clock of each receiver is not reset at the rising edge of a non-priority signal, the third bit data received is determined 0 at timing t4 shown in FIG. 9(e) (namely, clock stage 7), upon which the unit B stops transmission as described with reference to FIGS. 8(a)–(f). However, resetting the clock of the receiver at the rising edge of a non-priority signal does not provide clock stage 7 which is at timing t4, so that no bit data is established until timing t5. Then, at timing t5, the received data is determined as the bit data of 1 and the unit B recognizes that the same data as outputted by itself has returned, continuing the transmission. Namely, resetting the clock of the receiver at the rising edge of a non-priority signal compensates the data destruction caused by data collision.

The above-mentioned measures allow three units having unit addresses of either "00", "01", "10" or "11" to communicate in multiplex communication. However, a problem occurs if the units C and D whose unit addresses are "10" and "11" start transmission at approximately the same time and the unit D outputs "110" after 0 of the start bit, and then the unit C outputs "101" after 0 of the start bit. This problem is shown in the timing charts of FIGS. 10(a)–(f).

Figure 10:
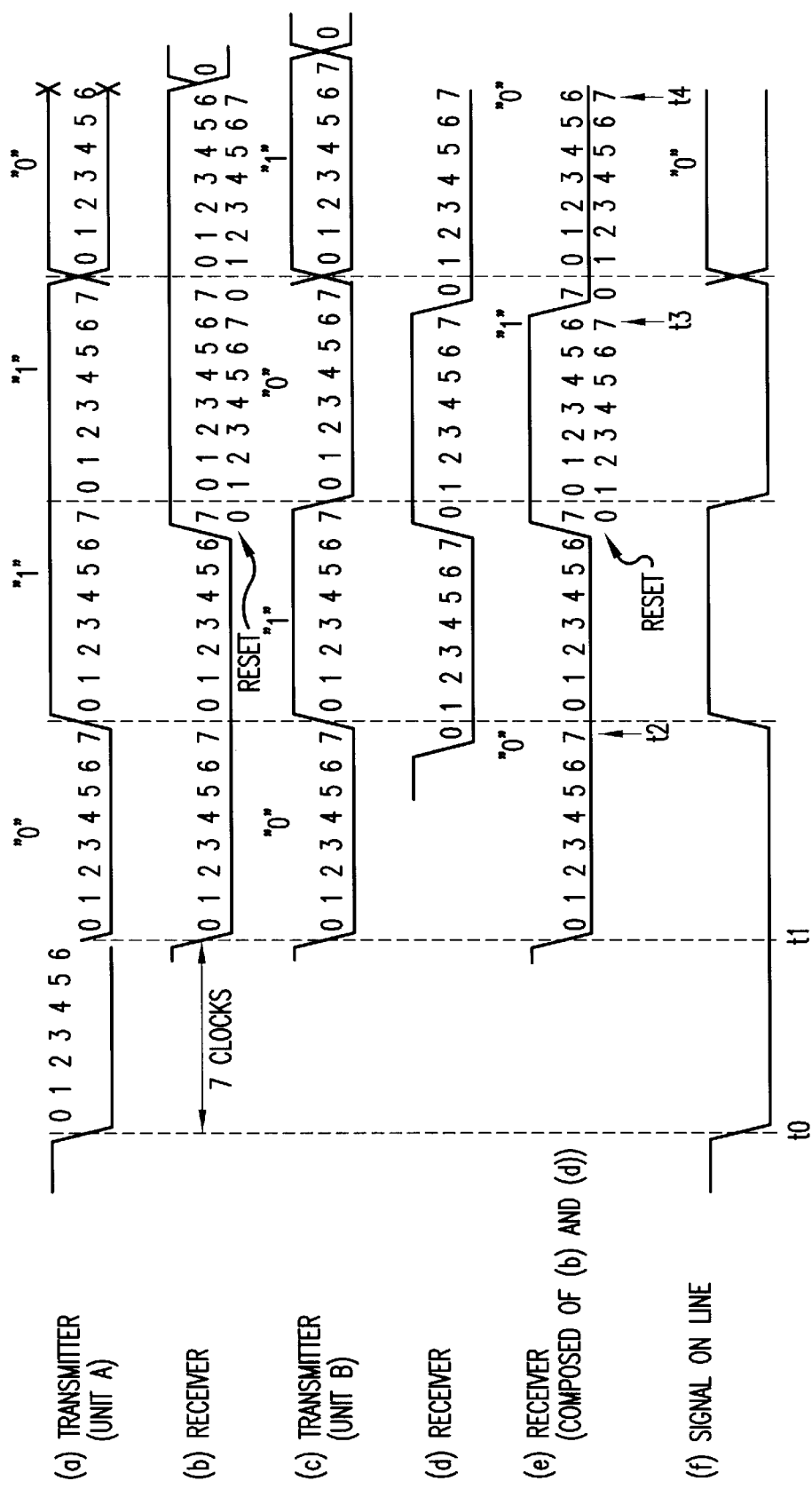
FIGS. 10(a)–(f) are timing charts indicative of the difficulty arising when data of "0110" and "0101" are transmitted from the transmitters of units C and D, with a time delay of 7 clocks.

Now, suppose that the unit C outputs data as "0110" as shown in FIG. 10(a), and the unit D outputs data as "0101" as shown in FIG. 10(c). Then, it is recognized that the receivers of the units C and D have received 0 at timing t2, 1 at timing t3, and 0 at timing t4. Therefore, the unit C abandons the transmission at timing t4 but it has already outputted 0 data up to clock stage 6. This 0 data collides with the 1 data of the unit D to become 0 data on the digital communication line 1 as shown in FIG. 10(f), thereby destroying the 1 data of the unit D.

Figure 11:
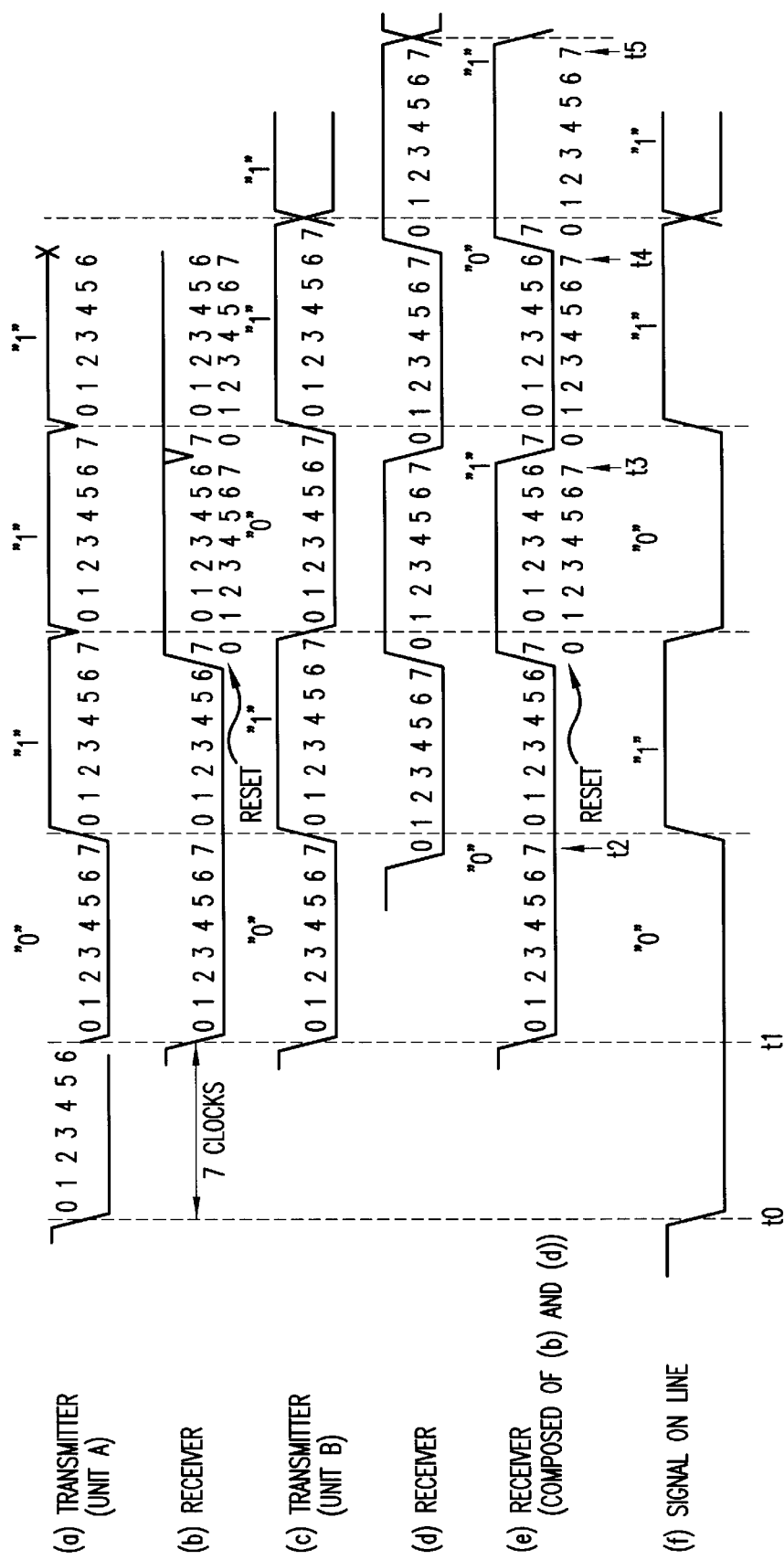
FIGS. 11(a)–(f) are timing charts illustrating how the above difficulty is resolved.
Figure 14:
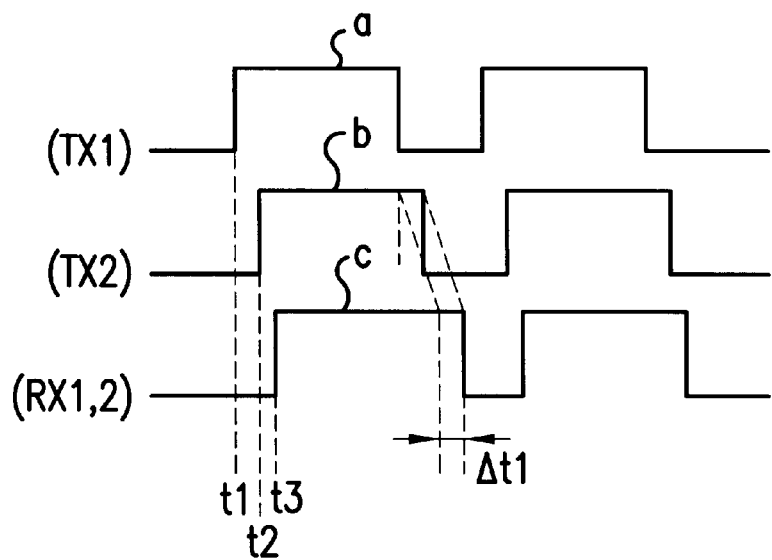
FIG. 14 is a waveform diagram illustrating the difficulty in multiplex communication based on conventional pulse width digital modulation.
Figure 15:
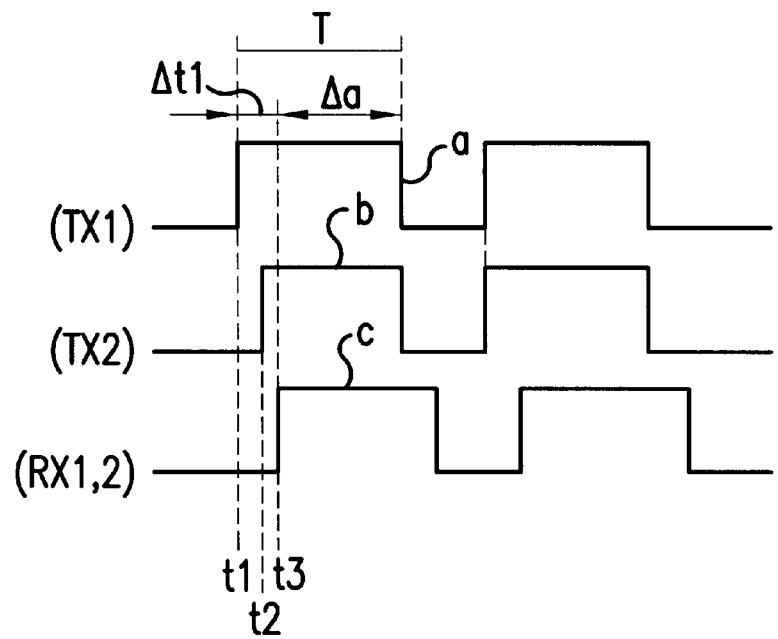
FIG. 15 is a diagram explaining how the difficulty indicated in FIG. 14 is resolved.

Consequently, the present invention provides the synchronous bit of 1-data (refer to FIG. 12) after the unit address as described with reference to FIG. 4. The reason why this arrangement prevents the destruction of the 1 data of the unit D will be described with reference to FIGS. 11(a)–(f). The unit C determines at timing t4 that data different from the data outputted by itself has returned and stops the transmission. At this stop, the unit C has already outputted the synchronous bit, which is the 1-data, up to clock stage 6. Likewise, as shown in FIG. 11(c), the unit D also outputs the synchronous bit at the same time and then the 1 data. Therefore, as seen from FIG. 11(f), the signal on the digital communication line 1 becomes "01011", transmitting the data of the unit D intact, without destruction.

Thus, inserting 1 bit of synchronous bit, which is 1-data, into the communication format after the unit address can prevent data destruction if the units C and D having unit addresses "10" and "11" start transmission at the same time. Consequently, as shown in FIG. 12, the four units having unit addresses "00", "01", "10", and "11" can communicate in multiplex communication in the system according to the invention.

In the above, a multiplex communication system having four units each having a 2-bit unit address has been described. It will be apparent that the present invention is not limited to the above-mentioned configuration. For example, providing 3-bit unit addresses and adding a 1-data synchronous bit allows 7 units to be employed. In this case, as shown in FIG. 13 the unit addresses are "000", "001", "010", "011", "100", "101", and "111", which form a multiplex communication system. In this case, data destruction may occur if the unit address "110" collides with the unit address "100" or the unit address "110" with the unit address "101", so that the unit address "110" is excluded from the setting.

As mentioned above, if the time delay between the transmitter of a communication apparatus and the receiver for receiving data sent from the transmitter is within 1-bit time, starting of data transmission by two or more transmitters within that delay time does not cause data destruction due to data collision, thereby securing normal communication. If the unit address is 2-bit-long, 4 communication apparatus can be interconnected and, if the unit address is 3-bit-long, 7 communication apparatus can be interconnected. Increasing the number of communication apparatuses, and accordingly the number of unit addresses, is considered to be within the scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of preventing data destruction in a communication system, comprising the steps of:
    providing a plurality of communication apparatuses, each having a transmitting unit, a receiving unit, a transmission clock unit, and a reception clock unit;
    transmitting a data signal using said transmitting unit;
    receiving said data signal using said receiving unit, said transmitted and said received data signals including 1-bit data;
    starting said transmission clock unit when the transmitted data signal is received by said receiving unit;
    resetting said reception clock unit;
    comparing said transmitted data with said received data in a bit serial manner;
    stopping transmission of said data signal when a mismatch is detected between said transmitted data and said received data; and
    time-dividing the 1-bit data using said transmission clock unit.

2. The method of preventing data destruction according to claim 1, wherein said plurality of communication apparatuses includes a first, a second, and a third communication apparatus, and the method further includes the steps of:
    connecting an ignition driver to said first communication apparatus;
    connecting a fuel injection driver to said second communication apparatus; and
    connecting an anti-lock brake system (ABS) driver to said third communication apparatus.

3. The method of preventing data destruction according to claim 1, further comprising the steps of:

provinding the transmitted data signal with a start bit; and providing the transmitted data signal with a unit address, the unit address indicating the priority of the transmitted data signal.

4. The method of preventing data destruction according to claim 3, wherein the reception clock unit is reset when said received data becomes nonpriority data.

5. The method of preventing data destruction according to claim 3, wherein the transmitted data signal is provided with a non-prioritized bit signal after the unit address to determine transmission priority.

6. The method of preventing data destruction according to claim 3, further comprising the steps of:

providing the transmitted data signal with a 1-bit synchronous bit;

providing the transmitted data signal with a 2-bit data address;

providing the transmitted data signal with a 1-bit parity bit; and providing the transmitted data signal with a 1-bit stop bit.

7. The method of preventing data destruction according to claim 3, wherein, when a time delay between said transmitting unit and said receiving unit is greater than five clocks, the transmission clock unit is started when the the receiving unit receives a falling edge of the start bit of said data transmitted signal, and the reception clock unit is reset at a rising edge of a non-priority signal.

8. The method of preventing data destruction according to claim 1, wherein said plurality of communication apparatuses includes four communication apparatuses, and the transmitted data signal is formatted with a 1-bit start bit, a 2-bit unit address, a 1-bit synchronous bit, a 2-bit data address, 8-bit data, a 1-bit parity bit, and a 1-bit stop bit.

9. The method of preventing data destruction according to claim 1, wherein said plurality of communication apparatuses includes seven communication apparatuses, and the transmitted data signal is formatted with a 1-bit start bit, a 2-bit unit address, a 1-bit synchronous bit, a 3-bit data address, 8-bit data, a 1-bit parity bit, and a 1-bit stop bit.

10. The method of preventing data destruction according to claim 1, wherein the step of providing a plurality of communication apparatuses includes a step of providing a comparator, a first buffer, and a second buffer for each communication apparatus, and the step of comparing said transmitted data with said received data in a bit serial manner includes the steps of:

storing said transmitted data in said first buffer;

storing said received data in said second buffer; and comparing said stored transmitted and said stored received data using said comparator.

11. A communication system comprising:

a plurality of communication apparatuses connected by a transmission line, each apparatus including:
a transmitting unit for transmitting data;
a receiving unit for receiving data;
a first buffer for storing said transmitted data;
a second buffer for storing said received data;
a comparing unit, said comparing unit including a comparator which compares said stored transmitted and said received data;
a transmission clock unit;
a reception clock unit; and
a clock unit; and
a central processing unit,
wherein said transmission clock unit is started when said transmitted data is received by said receiving unit, said reception clock is reset when received data becomes non-priority data, said comparing unit compares said transmitted and said received data for mismatches, and said transmitting unit is stopped when the comparing unit detects a mismatch.

12. The communication system according to claim 11, wherein the plurality of communication apparatuses includes a first, a second, and a third communication apparatus, and the system further comprises:

an ignition driver connected to said first communication apparatus;

a fuel injection driver connected to said second communication apparatus; and an ABS driver connected to said third communication apparatus.

13. The communication system according to claim 11, wherein said transmitted data within the communication system is formatted with a start bit, a unit address, and a non-prioritized bit signal placed after the unit address for determining transmission priority.

14. The communication system according to claim 11, wherein each of said transmitting units transmits 1-bit data over said transmission line, each clock unit time-dividing said 1-bit data to perform bit serial communication control to establish bit data, the bit serial communication control being a function of a state of a plurality of elements of data obtained by the time division.

15. A method of preventing data destruction in a vehicle control system, the method comprising the steps of:

providing at least one communication apparatus, said at least one communication apparatus having a transmitting unit, a receiving unit, a transmission clock unit, and a reception clock unit;

transmitting data using said transmitting unit;

receiving said data using said receiving unit, said transmitted and said received data including 1-bit data;

starting said transmission clock unit when the transmitted data is received by the receiving unit;

comparing said transmitted data with said received data in a bit serial manner;

stopping transmission of said data when a mismatch is detected between said transmitted data and said received data; and time-dividing the 1-bit data using said transmission clock unit.

* * * * *